Dec. 16, 1952     E. P. SENNE     2,621,756
FILTER REPLACEMENT MECHANISM FOR VACUUM CLEANERS
Filed Jan. 3, 1949     7 Sheets-Sheet 1

INVENTOR.
EDGAR P. SENNÉ
BY
Kenyon & Kenyon
ATTORNEYS

Dec. 16, 1952     E. P. SENNE     2,621,756

FILTER REPLACEMENT MECHANISM FOR VACUUM CLEANERS

Filed Jan. 3, 1949     7 Sheets-Sheet 2

INVENTOR.
EDGAR P. SENNÉ
BY Kenyon & Kenyon
ATTORNEYS

Dec. 16, 1952  E. P. SENNE  2,621,756
FILTER REPLACEMENT MECHANISM FOR VACUUM CLEANERS
Filed Jan. 3, 1949  7 Sheets-Sheet 3

INVENTOR.
EDGAR P. SENNÉ
BY Kenyon & Kenyon
ATTORNEYS

Dec. 16, 1952        E. P. SENNE        2,621,756
FILTER REPLACEMENT MECHANISM FOR VACUUM CLEANERS
Filed Jan. 3, 1949        7 Sheets-Sheet 6

INVENTOR.
EDGAR P. SENNÉ
BY Kenyon & Kenyon
ATTORNEYS

Dec. 16, 1952 E. P. SENNE 2,621,756
FILTER REPLACEMENT MECHANISM FOR VACUUM CLEANERS
Filed Jan. 3, 1949 7 Sheets-Sheet 7

INVENTOR.
EDGAR P. SENNÉ
BY
Kenyon & Kenyon
ATTORNEYS

Patented Dec. 16, 1952

2,621,756

UNITED STATES PATENT OFFICE 2,621,756

FILTER REPLACEMENT MECHANISM FOR VACUUM CLEANERS

Edgar P. Senné, Rockville Centre, N. Y., assignor to Electrolux Corporation, New York, N. Y., a corporation of Delaware Application January 3, 1949, Serial No. 68,953

7 Claims. (Cl. 183—37)

This application is a continuation-in-part of my application Serial No. 9,048, filed February 18, 1948, same title, now abandoned.

This invention relates to improvements in filter replacement mechanisms for air filter machines, for example, vacuum cleaners either of the relatively fixed position type or those of the type adapted to be freely and easily propelled over a floor in any desired random direction by small manual forces applied by a domestic user, such as disclosed and claimed in my co-pending applications Serial No. 749,772, filed May 22, 1947, and Serial No. 702,389, filed October 10, 1946, now abandoned.

It has among its objects the provision of an improved filter-containing unit permitting the convenient and ready insertion or removal of a preferably dispensable filter, such as a dirt or dust collecting bag of paper, cloth or like material with the view to enhancing the ease, speed and convenience with which a domestic user may perform the operation of replacing the filter.

The features of the invention on which patent protection is sought are set forth in the appended claims. The invention itself, together with further objects and the advantages thereof may best be understood by reference to the following specification and accompanying drawings illustrating several preferred embodiments of the invention.

Figure 13:
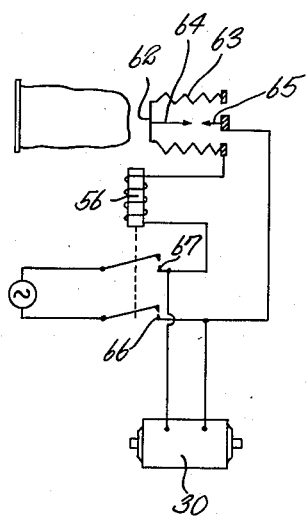

Fig. 13 is a wiring diagram showing the manner of connecting the air propelling motor and the automatic release relay for the filter casing to a power supply and the switches governing their respective operations; and Figs. 14, 15, 16 and 17 illustrate alternative embodiments of the invention in machines of more conventional type, i. e., machines not having a suspended chassis as in my aforementioned applications.

Although the invention may be embodied in machines having relatively fixed parts and which may be either stationary or mobile, the machine of the illustrated embodiment of Figs. 1 to 13 may comprise generally a chassis 1 of roughly cylindrical outline supported by two large wheels 2 and 3 mounted on the ends of a transverse shaft or axle 5 and for free rotation about the axis thereof. These wheels are preferably domed outwardly on either side of the chassis and the annular shell of the chassis, between the wheels, is preferably correspondingly rounded so that, with the exceptions to be noted below, the entire unit presents the general appearance of a sphere. The configuration thus presented is convenient for preventing interference with obstructions such as furniture and rugs during motion of the machine over a floor and in addition presents a somewhat pleasant appearance. The wheels 2 and 3 have annular rim portions 6 projecting outwardly from the general contour and terminating in the circular treads 7.

Chassis 1 is preferably divided by a transverse partition or wall 8 into a filter compartment 9 above axle 5 and an air propulsion compartment 10 therebelow, the center of gravity of the chassis being below the axle 5 whereby the wall 8 will normally assume a horizontal position when the chassis is freely suspended. The structure thus far is substantially that of my aforesaid applications. The improvements of the present invention will now be outlined in greater detail.

The chassis and filter unit

The improvement chassis construction of the Figs. 1 to 13 embodiment is best seen generally by reference to the Figures 3, 5, 9 and 10 and comprises two flat side plates 11 and 12 of circular outline, spaced apart by partition 8 in parallel planes sufficiently to provide space between them for the filter compartment 9 and the air propulsion compartment 10. The distance between these plates 11 and 12 approximately equals the distance which separates the inner edges of the treads 7. The annular edge of each plate extends beyond the shell member 13 and almost, but not quite, to the diameters of treads 7.

Figure 10:
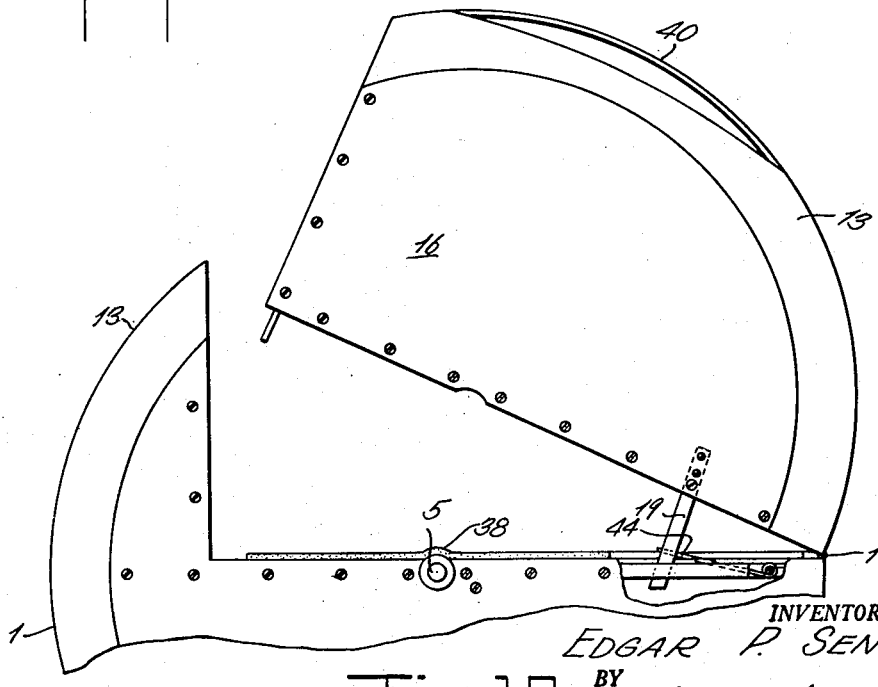
Figure 11:
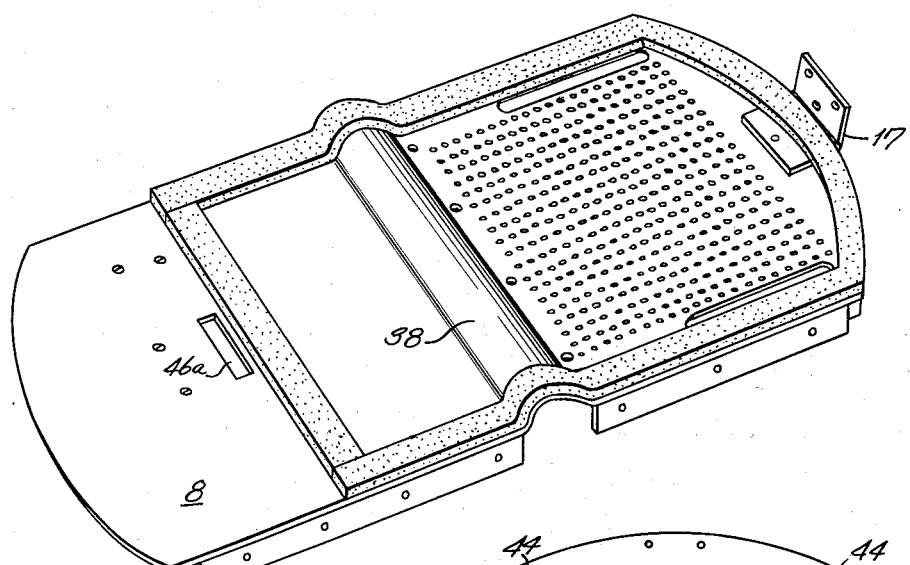
Fig. 11 illustrates in perspective the central partition dividing the chassis into a filter compartment above the partition and an air propulsion compartment therebelow.
Figure 12:
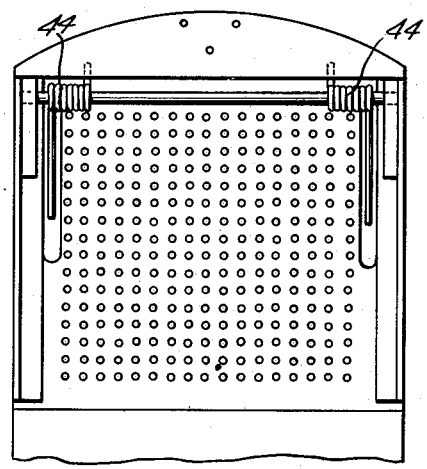
Fig. 12 illustrates one detail of the hinge mechanism for the filter casing showing particularly the spring means for biasing the same to its open position.

The outer walls of the chassis are formed by the curved shell member 13 (see Fig. 5) having inwardly extending side walls 14 and 15, for securing member 13 to the side plates 11 and 12 except for those portions forming side walls of the hinged filter casing to be described below. The outer portion of the shell 13 is preferably suitably shaped to conform to the general spherical contour of the machine as previously described. As better shown in Figs. 9 and 10, that portion of the curved shell member 13, which forms the filter compartment 9, is provided in accordance with the invention with a movable sector-shaped filter containing unit or casing 16 mounted for hinged movement about the transversely extending hinge 17 in such manner that it may be moved outwardly to an open position such as shown in Fig. 10, or inwardly to the position shown in Fig. 9 in which it conforms to the general contour of the chassis, the latter being its position during the normal operation of the machine as a mobile air filtering unit. The casing 16 may be limited in its outward motion by means of the holding means shown best by Figure 6. These may comprise simply rods 18 and 19 affixed to the side walls of the casing 16 and provided at their lower ends with flanges or hook-like members 20 and 21 which engage the partition 8 when the filter casing 16 is rotated to its outer position and thereby limit the extent of its outward movement. If desired, the members 20 and 21 may be constructed as to be releasable from engagement with partition 8 in the open position whereby the casing 16 may be rotated to an extreme clockwise position for permitting ready access to the interior as for repair purposes. For example, the members 20 and 21 may be so constructed that inward bending of rods 18 and 19 will cause members 20 and 21 to pass through the openings in partition 8 through which rods 18 and 19 extend.

Figure 1:
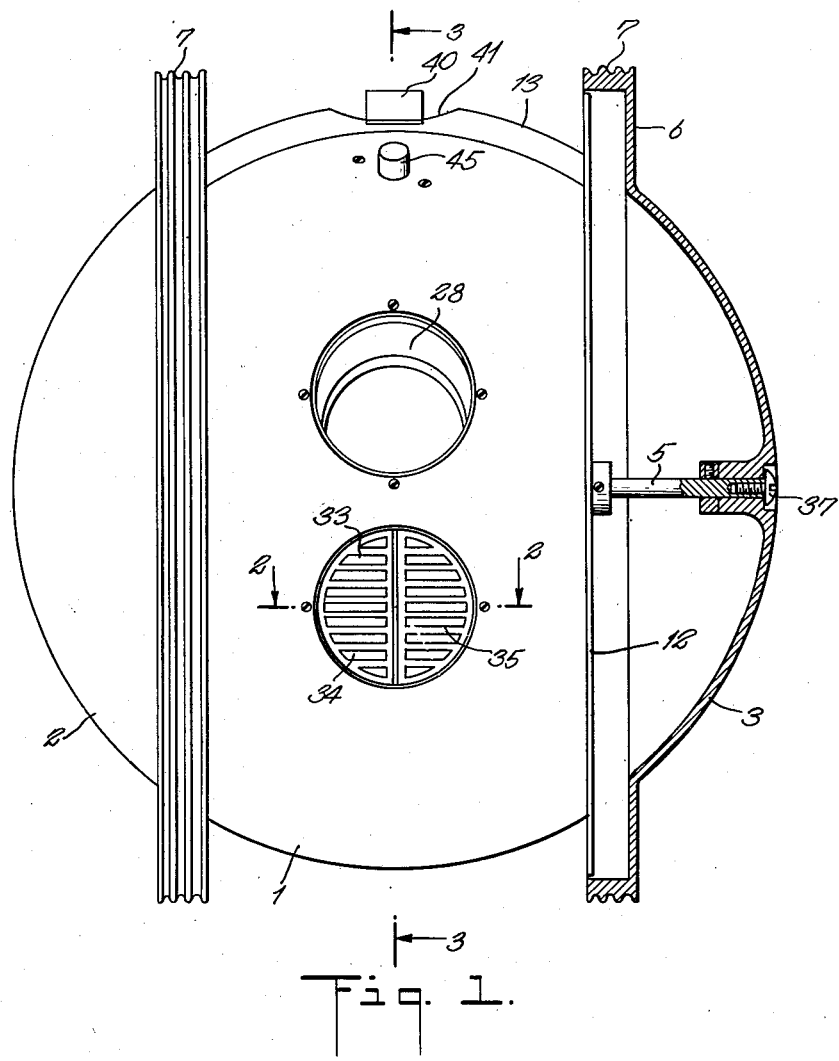
Fig. 1 is a plan view partly in section of what may be termed the front face of a machine like those of my aforementioned applications.
Figure 2:
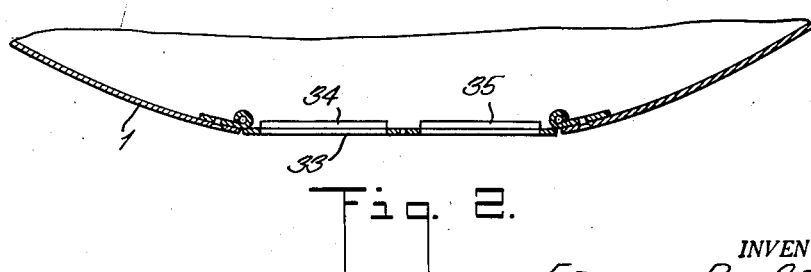
Fig. 2 illustrates by way of a cross-section taken along the line 2—2 of Fig. 1 the air outlet passage of the machine, together with appropriate open mesh gates for blocking the passage to objects of size sufficient to damage the machine.

It will be observed that the arrangement has the advantage that when the casing 16 is in its outward position, the filter bag is presented to the user at such a height above the machine proper and in such relative separation from the other parts of the machine that the filter bag may be conveniently removed or inserted—and this without any necessity of taking apart any section of the machine, nor even disconnecting it may support or contain a filter unit such as a cloth bag 23 of the usual type. Any suitable filter bag construction for insertion within the casing 16 may be employed. There is shown, for example, the bag 23 fixedly secured to a rigid forming frame 24 holding its neck or entrance open and adapted to fit over the rim 25 of the casing 16 while being supported in part by the L-shaped flanges 26 and 27 upon which frame 24 may rest. It will be apparent that with the casing 16 in the closed position as shown in Fig. 1, the frame 24 will fit tightly against the rim 25 of the casing and provide means for holding the neck of the cloth bag in alignment with the intake manifold, i. e., in the path of incoming air currents be filtered. Preferably, although not necessarily, the bag 23 is of the dispensable type, that is, it may be disposed of after one using and completely replaced by a new one, for example, one of the type disclosed and claimed in my co-pending application Serial No. 27,277, filed May 15, 1948, now Patent No. 2,543,556, dated February 27, 1951.

For the purpose of introducing air to be filtered, as through a portable hose arrangement (not shown) of the type common with vacuum cleaners, a suitable inlet or intake manifold may be provided in a position juxtaposed to the entrance to the filter bag 23. For example, the inlet is shown as being formed within the remaining sector of the filter compartment not taken up by the filter casing 16. This may comprise any suitable construction such as a tube 28 having an inlet orifice in the outer shell of the chassis and an outlet orifice in a fixed wall 29 in juxtaposition to the opening of the filter casing 16 in the closed position of the latter. The tube 28 is adapted to receive one end of a portable vacuum cleaner hose of the common type. As already noted, this arrangement has the advantage that the hose need not be disconnected from the machine during the filter replacement operation.

For the purpose of providing a suitable flow of air to be filtered, suitable means such as the motor and fan unit 30 may be mounted within the compartment 10 in a manner disclosed in my aforesaid applications. This may comprise any convenient construction known to those skilled in the art and, therefore, need not be set forth in detail here. Projecting through the outer wall of the compartment 10 there may be provided a plunger actuated "off-on" switch 31 arranged to connect or disconnect the propulsion unit 30 from the source of electrical power when the chassis is rotated in a clockwise direction (as seen from Fig. 3) to the point where the actuating plunger 32 of the switch 31 will be forced inwardly by contact with the floor or other surface opposed to the plunger 32. This feature is shown and claimed in my aforesaid applications and, therefore, further details are omitted here. Likewise, since the wiring circuit connecting both the switch 31 and the propulsion unit 30 and the relay 56 (hereinafter to be described) will be quite obvious to those skilled in the art, the details thereof are omitted except for the simplified circuit diagram shown in Fig. 13.

Figure 3:
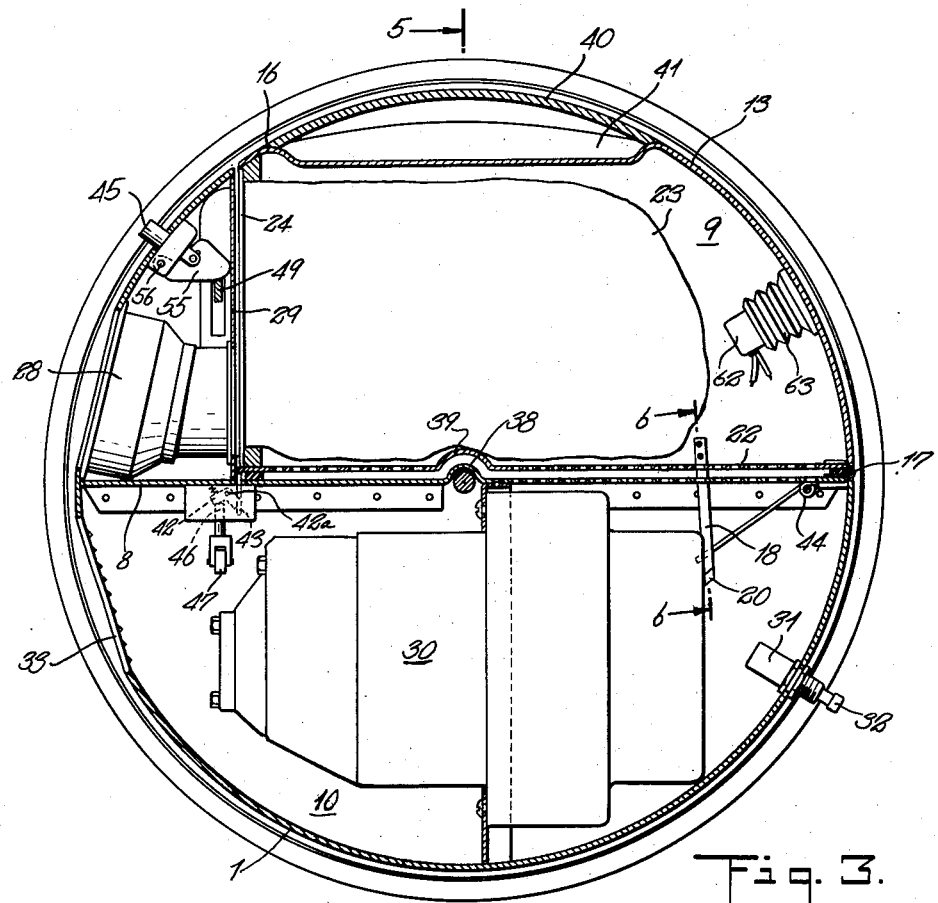
Fig. 3 illustrates a longitudinal cross-section of the machine taken along the line 3—3 of Fig. 1 and showing the internal elements within the chassis thereof.
Figure 4:
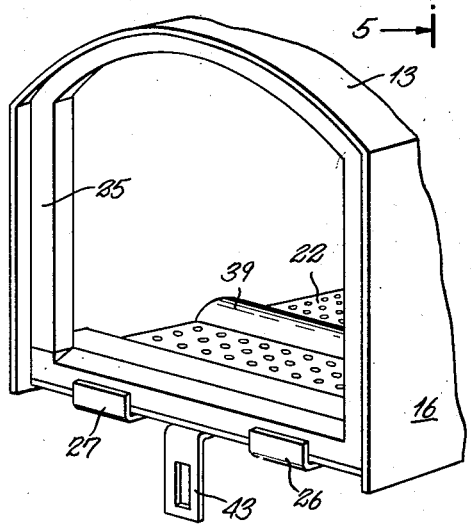
Fig. 4 illustrates in perspective a partial view of the filter-containing unit or casing hinged within the chassis as hereinafter described.
Figure 5:
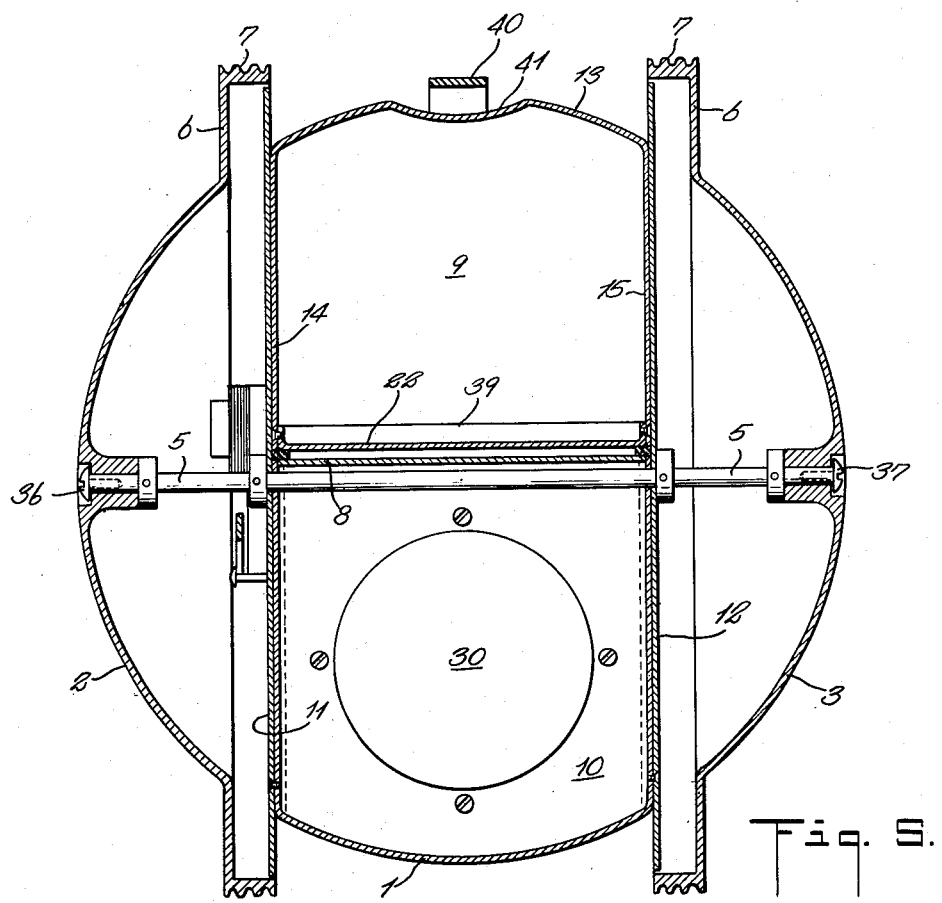
Fig. 5 represents a transverse cross-section taken along the line 5—5 of Fig. 3.
Figure 6:
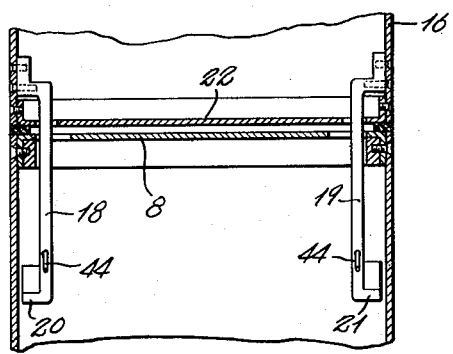
Fig. 6 illustrates one detail of the hinge mounting of the filter-containing casing of Fig. 4.
Figure 7:
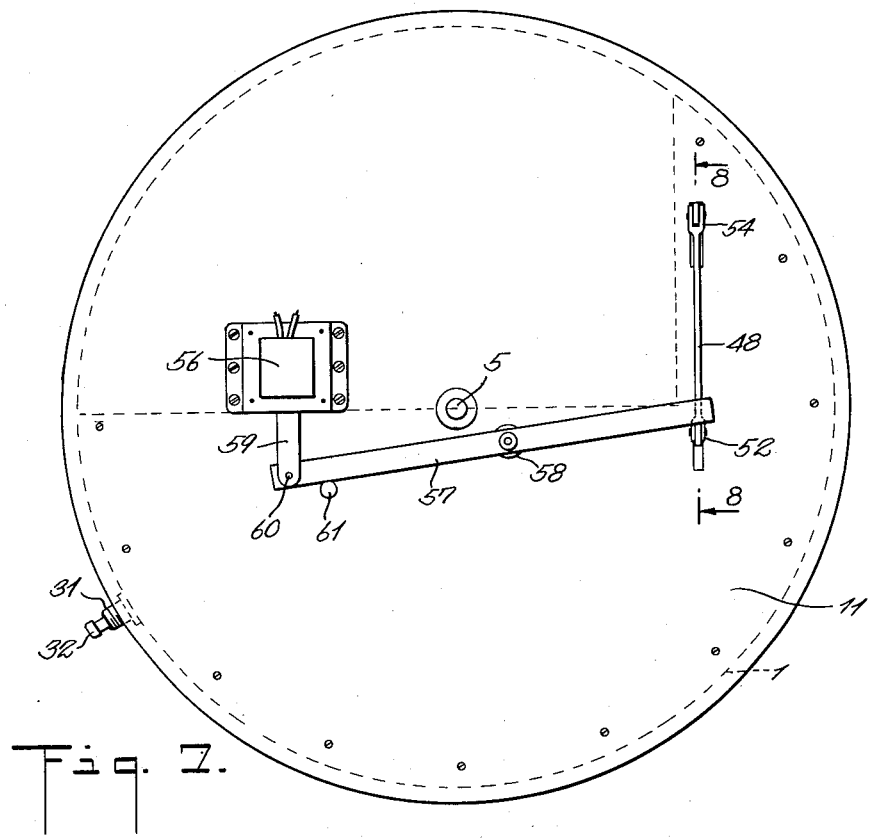
Fig. 7 illustrates a longitudinal view of the lever mechanism for releasing the filter-containing casing for removal of the filter, together with the hereinafter described relay forming one element of the automatic release feature.
Figure 8:
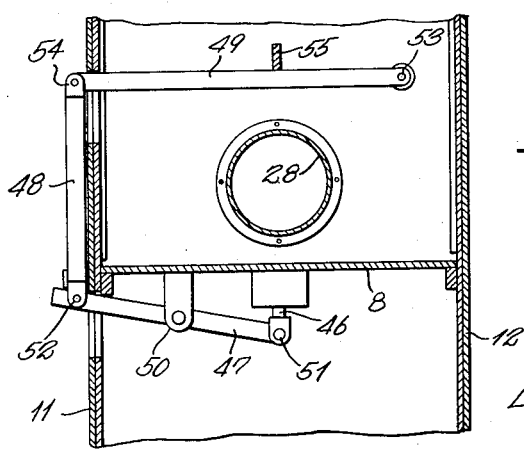
Fig. 8 illustrates a transverse view of the lever mechanism of Fig. 7.
Figure 9:
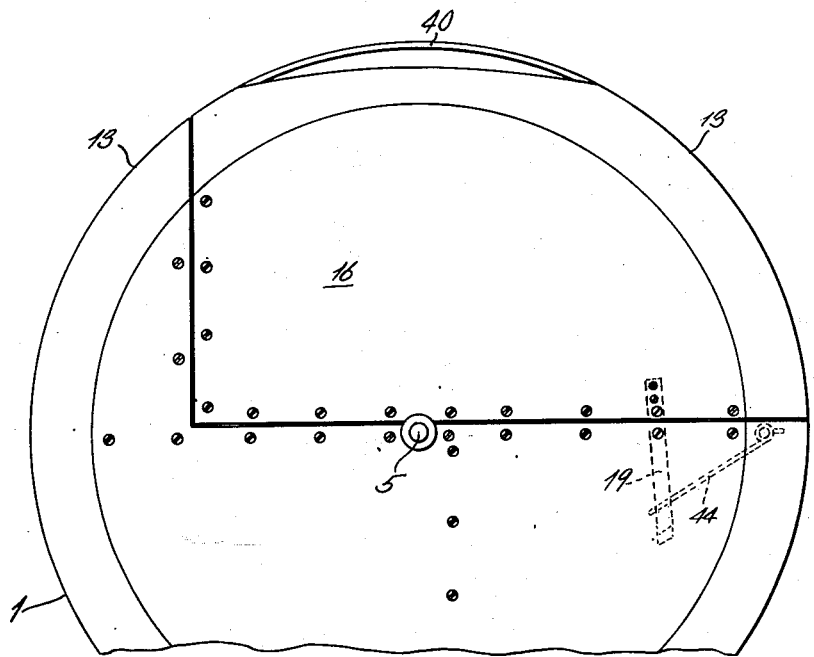
Figs. 9 and 10 represent plan views of the chassis illustrating respectively the closed and open positions of the filter-containing casing.

As more clearly shown in Figs. 3 and 4, the hinged casing 16 includes a lower floor member 22 perforated for the free passage of air and closing the lower side of casing 16 in order that the hose hereinafter described. Moreover, it may be arranged to be ejected onto the floor as by automatic spring ejection mechanisms of suitable design.

The compartment 10 is provided with an outlet orifice 33 for the egress of filtered air. This outlet may be provided with the hinged doors 34 and 35 (Fig. 2) which are preferably of apertured or open-latticed construction in order that they not inhibit too greatly the free flow of air.

Support for the chassis

The entire chassis unit is supported between the wheels 2 and 3 by means of the shaft 5 which is substantially in the plane of the partition 8 and passes through the side plates 11 and 12 at about the center of each of them. The end portions of the rods provide bearings upon which the hubs of the wheels 2 and 3 are respectively journalled and secured by means of the screws 36 and 37 which may be removed for removal of the wheels.

The partition 8 is provided with an upwardly projecting transverse ridge 38 and lower concave side thereof seats upon the shaft 5. A similar ridge 39 and lower concave surface thereof is provided in the lower floor 22 of the filter-containing casing 16 in order that it may mesh as closely as possible with the structure of the partition 8. The ridge 38 and the side plates 11 and 12 transmit the weight of the chassis to the shaft 5 by which it is supported in such manner as to be capable of rocking upon the shaft under gravitational forces of the entire chassis structure which preferably has its center of gravity below the shaft 5 in the manner shown and claimed in my aforesaid applications first mentioned.

The entire machine may be lifted for transportation by means of a handle 40 affixed to casing 16 and bridging a depression 41 therein.

Locking mechanism for the filter casing

For the purposes of the invention the filter casing 16 may be held in its normally closed position during operation of the machine by the engagement of any suitable inwardly spring-biased retractable latching bolt, such as the rotatable cam 42, journalled at 42a, with the latch 43 affixed to casing 16 and protruding through aperture 46a (Fig. 11) of wall 8. Biasing springs 44 (Fig. 12) suitably mounted, normally tend to bias casing 16 to the open position (Fig. 10) by exerting spring pressure on rods 18 and 19. When it is desired either to replace or clean the filter bag 23, the latching bolt 42 must be withdrawn in order that the filter casing 16 may be moved to its open or outward position by the force of the biasing springs 44. This may be accomplished either manually by inward motion of the outwardly spring-biased push button 45 on the external surface of the chassis, or automatically as hereinafter described, through the lever mechanism (Figs. 7 and 8) comprising latching bolt actuator 46 arranged to withdraw the latching bolt by suitable means, and levers 47, 48 and 49. The lever 47 has its fulcrum on the fixed stud 50 and is rotatably journalled to the actuator 46 and the connecting lever 48 respectively at the journals 51 and 52. Lever 49 has its fulcrum on the journal 53 fixed to the wall 29 and is journalled to the connecting lever 48 at the journal 54. On the inward end of the button 45, there is provided the actuating cam 55 fixedly journalled at 56 and in engagement with the lever 49 in such manner that when cam 55 is rotated by inward motion of the button 45, cam 55 depresses the lever 49, the connecting lever 48, and through the lever 47 causes upward motion of the actuating member 46 to withdraw the latching bolt from the latch 43 fixed to the filter casing 16. It will be apparent, therefore, that upon manual depression of the button 45, the filter casing 16 will spring to its upward and outward position whereupon the filter bag 23 may be readily withdrawn and replaced. It will be observed that this arrangement permits the convenient and ready replacement of the filter bag by the user in a minimum amount of time.

Automatic release mechanism

It will be understood that it frequently happens, during the usage of vacuum cleaners, that the user is either unaware that the filter bag is filled and needs replacement or that it is completely overlooked with the disadvantageous result that cleaning efficiency is badly impaired by general clogging of the mechanism. It is therefore highly desirable that the user be warned of this condition in order that the bag may be replaced promptly upon being completely filled up, and preferable that he or she be forced to make replacement before further operation of the machine.

In accordance with the present invention, this problem is met by providing for an automatic release of the latching bolt 42 when the filter bag 23 becomes filled to some predetermined degree at which replacement becomes advisable. Numerous means to that end may be provided but I prefer, because of its simplicity, the disclosed arrangement comprising the electromagnet or relay 56 (Fig. 7) having a retractable armature operatively connected through the lever 57, fulcrumed at the journal 58, and the connector rod 59 journalled at the lever journal 60. It will be observed that upon upward withdrawal of the connector rod 59 by the relay mechanism, the lever 57 will force the outward end of lever 47 downwardly and thus actuate the latch bolt 42 in the manner already described in connection with the manual operation thereof. A stud 61 may be provided to limit the extent of the downward motion of the lever 57 to any suitable degree.

In order that the relay 56 may be energized in response to the filling of the filter bag, its energizing circuit may include a switch 62 (Fig. 3) within the filter casing arranged to be closed when the filter bag needs replacement. This may be accomplished by making switch 62 responsive to the change in air pressure in compartment 9 which occurs when the filter bag becomes filled to a substantial degree, or by placing switch 62 in juxtaposition to a distended position of the filter bag and so arranging it that when it is closed by mechanical pressure from a completely filled filter bag, it will close the energizing circuit for the relay. The switch 62 may comprise any suitable construction and I have shown it as comprising an extensible or flexible bellows member 63 completely enclosed and having therein a pair of switch contacts (not shown) which are brought into actual contact when the bellows is compressed. This entire arrangement is best illustrated by the schematic circuit diagram of the Figure 13 in which the contacts 64 and 65 of the switch 62 are all shown as being in series with the energizing solenoid of the relay 56 and a suitable source of electric voltage, such as a domestic power source, supplied when the contacts 64 and 65 are closed. It will be seen, therefore, that upon closure of the contacts 66 and 67 for normal energization of the air propelling unit 30 in normal operation, the circuit of relay 56 and switch 62 will be ready for automatic operation as hereinbefore described.

It will be apparent that if during the normal operation of the vacuum cleaner the filter bag 23 becomes completely distended by the complete filling of dust or dirt, the filter casing will automatically be released and will spring to its open or upward position whereupon the operator will be warned of the condition and will be afforded an opportunity to remedy it forthwith. In fact, he will be forced to replace the filter bag before the machine can be further operated, thereby precluding inefficient operation. It will be understood that the degree of resilience of the bellows 63 may be so selected that it will give way to compression by the normally available force of distention of the filter bag and at the same time it may be made sufficiently rigid that it will not be improperly operated until the bag is completely filled and distended. Similarly, if made responsive to change in air pressure in compartment 9, as aforesaid, its resilience may be appropriately adjusted to the pressure differential existing between the filled and non-filled condition of the filter bag.

If desired, and in order that all operation of the machine cease when filter 23 becomes filled, the operation of relay 56 may also be so arranged as to de-energize automatically the unit 30. Such action may for example be accomplished by causing the relay 56 to actuate switch 32 by suitable interconnecting levers. The latter are not shown because suitable constructions will occur to those skilled in the art but they are illustrated schematically in Fig. 13 by the placing of relay 56 in circuit position to open the contacts 66 and 67. It will be understood of course that the switch employed for contacts 66 and 67 should preferably be such as will remain open, when once opened, until again closed intentionally to re-energize unit 30—this in order to prevent any tendency of the system to cause unit 30 to be re-energized by opening of contacts 64 and 65 while the filter is being replaced. Without such provision there may be a tendency for unit 30 to "hunt," i. e., be switched on and off intermittently while casing 16 is open. Switches of this character are well known.

Ways in which the invention may be incorporated in other more conventional types of machines may be visualized by reference to the Figs. 14 through 17.

Figure 14:
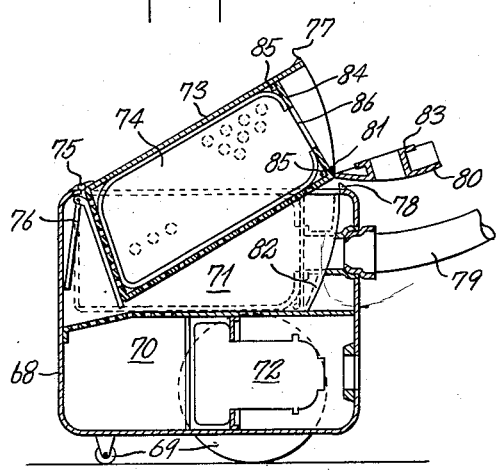
Figure 15:
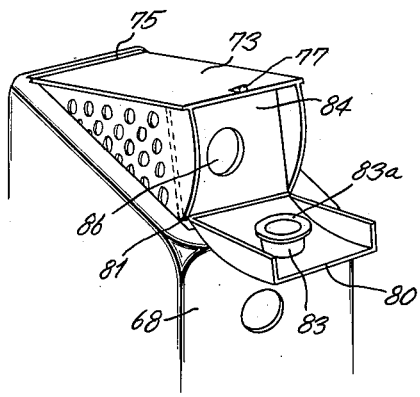

Referring to the Figs. 14 and 15, I show a machine in which the chassis 68, by contrast with the preceding embodiment, is relatively stationary with respect to a set of optional wheels 69 which may be provided for the purpose of transportation. As before, the chassis may comprise an air propulsion compartment 70 and an air filter compartment 71. In the former there is positioned a motor fan unit 72 as before; while in the latter there is provided the movable casing 73 arranged to elevate the filter bag 74 to a convenient point of removal. The casing 73 is mounted for hinged rotation about some convenient axis 75 under the influence of the biasing spring 76. During normal operation, the casing is held in the closed position indicated by the dotted lines by a latching mechanism 77 cooperating with a suitable stop 78 on the chassis wall. To provide an air impervious connection between the suction hose 79 and the filter bag 74, there may be provided the mechanism of the door 80 hinged at the point 81 on the lower portion of the casing. It will be noted that its outer edge is of generally arcuate shape which fits with the arcuate shape portion 82 of the main body of the chassis. Through the door 80 there passes a tubular member 83 which defines an airflow path between the end of the hose 79 and the entrance of the bag. The inner end of the tubular member 83 is flanged outwardly and arranged so that it will press upon the cardboard plate 84 of the filter bag unit, a rubber sealing ring 83a being provided around the periphery to insure against leakage of air. The filter bag is held in position by the cardboard plate 84 which rests against suitable postioning stops 85 within the casing. The orifice of bag 74 is affixed around orifice 86 of cardboard plate 84, both orifices being positioned to align with member 83.

With the foregoing arrangement it will be apparent that the door 80 may be opened as shown in the Figs. 14 and 15 for ready removal and replacement of the filter bag unit and that when the casing is closed the door will also close to form a convenient sealing. Substantially the same automatic mechanisms for the automatic opening of the casing 73 may be provided as was the case with the earlier illustrations.

Figure 16:
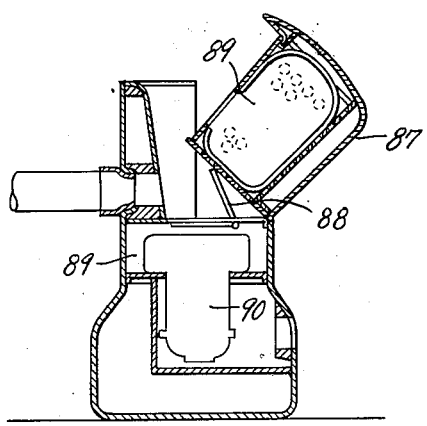
Figure 17:
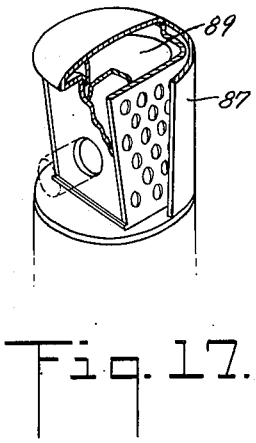

The Figs. 16 and 17 illustrate a type of machine which normally rests in a fixed position on the floor and in this case a similar casing 87 may be provided and biased by the spring 88 to move it to the outer position (Fig. 16) where the filter bag 89 may be removed. When closed against spring 88 it will take the position of Fig. 17 in which it is suitably locked. A similar air propulsion compartment 89 including the motor fan unit 90 may be provided as before.

It will be understood that in all of the foregoing arrangements a pre-folded filter bag which is automatically unfolded by the action of the incoming air to be filtered may be employed. Filter bags of this construction are illustrated and claimed in my co-pending application, Serial No. 27,277, filed May 15, 1948, entitled Cartridge-Like Filter Units for Vacuum Cleaners, now Patent No. 2,543,556.

It will be understood that the invention is not limited to any particular embodiment or any particular arrangement of the parts as hereinbefore outlined and that numerous modifications falling within the scope of the appended claims will occur to those skilled in the art.

What I claim is:

1. An air filtering machine of the type adapted to be propelled over a floor comprising a chassis suspended for free rotation about an axis of support and including a filter chamber above said axis and an air propelling mechanism therebelow when said chassis is in its normal freely suspended position, mobile means supporting said chassis for free rotation about said axis, and a mechanism adapted to contain a removable filter comprising a hinge-mounted casing within said filter chamber adapted to be moved by hinged movement upwardly from the body of said filter chamber for the insertion and removal of said filter.

2. A machine as in claim 1 including spring means adapted to bias said casing to the upward position and a releasable latch mechanism for holding said casing in a downward position against the biasing force of said spring means during normal operation of said machine.

3. An air filtering machine of the type adapted to be propelled over a floor comprising a pair of wheels and an interconnecting axle, a chassis suspended between said wheels and from said axle for free rotation thereabout and including a filter chamber above said axle and an air propelling mechanism therebelow when said chassis is in its normal freely suspended position, and a mechanism adapted to contain a removable filter comprising a hinge-mounted casing within said filter chamber adapted to be moved by hinged movement upwardly from the body of said filter chamber for the insertion and removal of said filter.

4. A machine as in claim 3 including spring means adapted to bias said casing to the upward position and a releasable latch mechanism for holding said casing in a downward position against the biasing force of said spring means during normal operation of said machine.

5. A vacuum cleaner of the type adapted to be propelled over a floor comprising a pair of wheels and an interconnecting axle, a chassis including a generally cylindrical portion freely suspended between said wheels from and coaxially with said axle for free rotation thereabout and including a normally horizontal transverse partition dividing said chassis into a filter compartment above said axle and an air propulsion compartment therebelow, and a mechanism adapted to contain a removable filter comprising a sector-shaped casing within said filter compartment hinged for rotation in the plane of said portion upwardly from the body of said filter compartment for the insertion and removal of said filter.

6. A machine as in claim 5 including spring means adapted to bias said casing to the upward position and a releasable latch mechanism for holding said casing in a downward position against the biasing force of said spring means during normal operation of said machine.

7. A vacuum cleaner as in claim 5 including an air intake manifold in said filter compartment apart from said casing.

EDGAR P. SENNÉ.

REFERENCES CITED

The following references are of record in the file of this patent:

UNITED STATES PATENTS

| Number | Name | Date |
|---|---|---|
| 996,810 | Sturgeon | July 4, 1911 |
| 1,096,814 | Dyer et al. | May 12, 1914 |
| 1,100,940 | Barner | June 23, 1914 |
| 2,169,656 | McNeeley | Aug. 15, 1939 |
| 2,580,645 | Doughman | Jan. 1, 1952 |